(12) United States Patent
Fujimoto

(10) Patent No.: US 9,099,901 B2
(45) Date of Patent: Aug. 4, 2015

(54) ELECTRIC POWER STEERING APPARATUS

(75) Inventor: Tadayuki Fujimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 209 days.

(21) Appl. No.: 13/979,904

(22) PCT Filed: May 11, 2011

(86) PCT No.: PCT/JP2011/060852
§ 371 (c)(1),
(2), (4) Date: Jul. 16, 2013

(87) PCT Pub. No.: WO2012/153402
PCT Pub. Date: Nov. 15, 2012

(65) Prior Publication Data
US 2013/0300264 A1   Nov. 14, 2013

(51) Int. Cl.
*H02K 11/00* (2006.01)
*H02K 5/22* (2006.01)
*B62D 5/04* (2006.01)

(52) U.S. Cl.
CPC ............... *H02K 5/22* (2013.01); *B62D 5/0406* (2013.01); *H02K 11/0073* (2013.01)

(58) Field of Classification Search
USPC .................. 310/64, 71, 68 R, 68 B, 68 D
See application file for complete search history.

(56) References Cited

U.S. PATENT DOCUMENTS

| | | | |
|---|---|---|---|
| 6,078,155 A * | 6/2000 | Tominaga et al. | 318/293 |
| 6,577,030 B2 * | 6/2003 | Tominaga et al. | 310/68 B |
| 7,989,997 B2 * | 8/2011 | Hashimoto et al. | 310/68 D |
| 8,304,944 B2 * | 11/2012 | Sonoda et al. | 310/68 B |
| 2002/0060105 A1 | 5/2002 | Tominaga et al. | |
| 2003/0173920 A1 | 9/2003 | Tominaga et al. | |
| 2006/0108884 A1 * | 5/2006 | Shiino et al. | 310/89 |
| 2007/0246289 A1 * | 10/2007 | Tominaga | 180/444 |
| 2010/0319976 A1 | 12/2010 | Nakai et al. | |

(Continued)

FOREIGN PATENT DOCUMENTS

| | | |
|---|---|---|
| CN | 102030031 A | 4/2011 |
| JP | 3638269 B2 | 4/2005 |
| JP | 2009-189187 A | 8/2009 |
| JP | 2009-277726 A | 11/2009 |
| JP | 2011-068204 A | 4/2011 |

OTHER PUBLICATIONS

Japanese Office Action, issued Mar. 4, 2014, Patent Application No. 2013-513856.

(Continued)

*Primary Examiner* — Thanh Lam
(74) *Attorney, Agent, or Firm* — Sughrue Mion, PLLC; Richard C. Turner

(57) ABSTRACT

A control device is made more compact and an electric power steering apparatus achieving excellent ease of assembly and ease of mounting is provided by disposing the control device between a shaft of an electric motor and a gear shaft of a speed reduction structure. A control device (90) is disposed coaxially with an output shaft (11) of an electric motor (10) between the electric motor and a speed reducer, and has a heat sink (30), a power circuit board (40), a control circuit board (50), and a housing (70) in which to house the power circuit board and the control circuit board. An electronic relay circuit board (60) that passes and interrupts a motor current is housed in the housing between the power circuit board and the electric motor, so that heat generated in the electronic relay circuit board is released to the housing.

4 Claims, 8 Drawing Sheets

(56) References Cited

U.S. PATENT DOCUMENTS

| | | | |
|---|---|---|---|
| 2011/0067945 A1 | 3/2011 | Sonoda et al. | |
| 2012/0313467 A1* | 12/2012 | Omae et al. | 310/71 |
| 2013/0088128 A1* | 4/2013 | Nakano et al. | 310/68 R |
| 2014/0091683 A1* | 4/2014 | Ito et al. | 310/68 R |

OTHER PUBLICATIONS

Communication dated Apr. 30, 2015 from the State Intellectual Property Office of the People's Republic of China in counterpart application No. 201180070737.5.

* cited by examiner

ELECTRIC POWER STEERING APPARATUS

CROSS REFERENCE TO RELATED APPLICATIONS

This application is a National Stage of International Application No. PCT/JP2011/060852 filed May 11, 2011, the contents of all of which are incorporated herein by reference in their entirety.

TECHNICAL FIELD

The present invention relates to an electric power steering apparatus including an electric motor that outputs an assist torque for the steering wheel of a vehicle and a control device that controls driving of the electric motor.

BACKGROUND ART

There is an electric power steering apparatus including an electric motor that outputs an assist torque for the steering wheel of a vehicle and a control device that controls driving of the electric motor, in which the control device is attached to the electric motor (see, for example, PTL 1).

This electric power steering apparatus has a power circuit board on which is mounted a bridge circuit to switch a current of the electric motor, an insulating printed-circuit board on which is mounted a microcomputer that generates a drive signal to control the bridge circuit, and a large-current board on which is mounted a capacitor to absorb current ripples on conductive plates forming a large-current wiring pattern and insert-molded with insulating resin.

A control device of a triple-layer structure having the power circuit board, the large-current board, and the insulating printed-circuit board layered in this order is disposed on the electric motor and parallel to the shaft thereof. The power circuit board and the large-current board are electrically connected with a connection member.

CITATION LIST

Patent Literature

PTL 1: Japanese Patent No. 3638269

SUMMARY OF INVENTION

Technical Problem

FIG. 8 is a longitudinal cross section showing an electric power steering apparatus in the related art.

In this electric power steering apparatus, a board of a control device 100 is formed of three boards including a power circuit board 101, a large-current board 102, and an insulating printed-circuit board 103. A capacitor 104 mounted on the large-current board 102 is disposed between the power circuit board 101 and the insulating printed-circuit board 103. In order to release heat generated in the power circuit board 101 to a heat sink 105, a surface of the power circuit board 101 is uniformly fixed to the heat sink 105 with fastening components, for example, screws. The control device 100 of this triple-layer structure is arranged parallel to the shaft of an electric motor 106 and attached to the electric motor 106. The control device 100 is electrically connected to the electric motor 106 by fixing the control device 100 to a conductive plate 107 connected to a coil wire of the electric motor 106 using a mechanical means, for example, bolts. Numeral 108 denotes a speed reducer coupled to the shaft of the electric motor 106.

The configuration as above, however, has problems that not only the apparatus is increased in size, but also ease of assembly is poor because of the need for a large number of fastening components, and that ease of mounting is adversely affected by disposing the control device 100 parallel to the shaft of the electric motor 106.

The invention was devised to solve the problems above and has an object to provide an electric power steering apparatus including an electric motor that outputs an assist torque for the steering wheel of a vehicle and a control device that controls driving of the electric motor, in which the control device is made more compact and which achieves excellent ease of assembly and ease of mounting by disposing the control device between a shaft of the electric motor and a gear shaft of a speed reduction structure.

Solution to Problem

The invention provides an electric power steering apparatus including an electric motor that outputs an assist torque for a steering wheel of a vehicle, a speed reducer that decelerates rotations of the electric motor, and a control device that is disposed between the electric motor and the speed reducer and controls driving of the electric motor. The control device includes: a heat sink that is made of a metal material having high heat conductivity; a power circuit board that has a bridge circuit formed of a plurality of semiconductor switching elements to switch a current of the electric motor according to a torque assisting the steering wheel and is fixed to the heat sink; a control circuit board that has a control circuit generating a drive signal to control the bridge circuit on the basis of a steering torque of the steering wheel and is electrically connected to the power circuit board via an electric conductor; an electronic relay circuit board that has a relay circuit passing and interrupting a motor current to be supplied to the electric motor and is electrically connected to the power circuit board via the electric conductor; and a housing to which the electronic relay circuit board is attached and in which the power circuit board and the control circuit board are housed.

Advantageous Effects of Invention

According to the electric power steering apparatus of the invention, the control device is disposed on the output shaft of the electric motor on the side of the speed reducer and combined with the speed reducer. Hence, not only does it become possible to reduce the periphery of the electric motor in size, but it also becomes possible to improve ease of mounting in comparison with the apparatus in the related art in which the control device is disposed parallel to the shaft of the electric motor.

Also, by fixing, as a relay portion that passes and interrupts a motor current to be supplied to the electric motor, the electronic relay circuit board to the housing, it becomes possible to make an electric connection simpler and smaller than a mechanical relay.

DESCRIPTION OF EMBODIMENTS

First Embodiment

Figure 1:
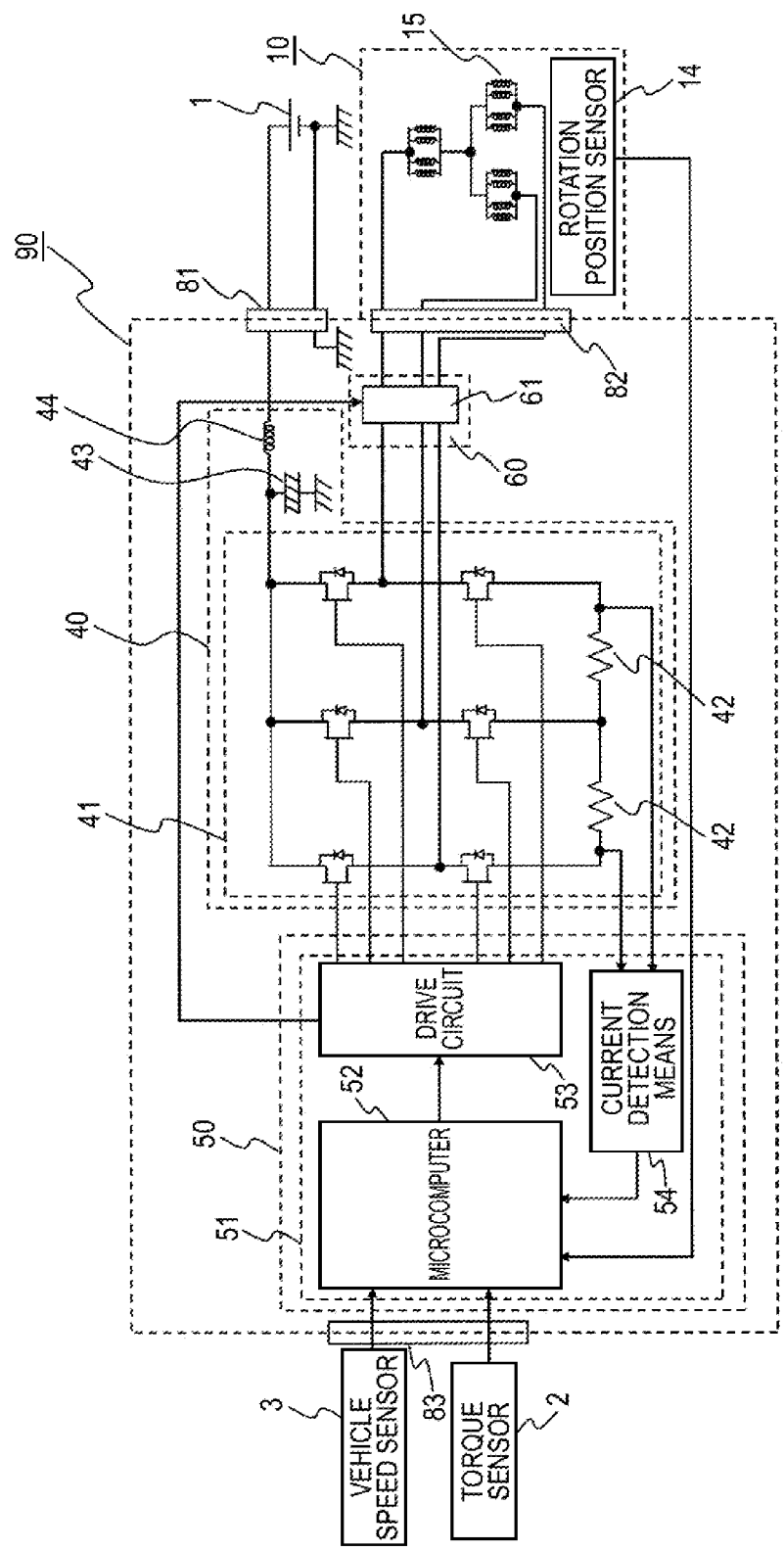
FIG. 1 is a block circuit diagram showing an electric power steering apparatus according to a first embodiment of the invention.

FIG. 1 is a block circuit diagram showing an electric power steering apparatus of the invention. This electric power steering apparatus includes an electric motor 10 that outputs an assist torque for the steering wheel (not shown) of a vehicle, a control device 90 that controls driving of the electric motor 10, a battery 1 that supplies a current to drive the electric motor 10, a torque sensor 2 that detects a steering torque of the steering wheel, a vehicle speed sensor 3 that detects a vehicle speed, a motor connector 81 that electrically connects the control device 90 and the electric motor 10, a power connector 82 that electrically connects the battery 1 and the control device 90, and a signal connector 83 that electrically connects the torque sensor 12 and the control device 60.

The electric motor 10 has an armature winding 15 connected to three phases of a stator (not shown) and a rotation position sensor 14 that detects a rotation position of a rotor (not shown).

The control device 90 includes a three-phase bridge circuit 41 formed of a plurality of semiconductor switching elements (for example, FETs) Q1 through Q6 to switch a motor current IM according to magnitude and a direction of an assist torque, shunt resistors 42 to detect the motor current IM, a large-capacity capacitor (about 2200 µF×3) 43 to absorb ripple components of the motor current IM flowing to the electric motor 10, a coil 44 to remove electromagnetic noises, and an electronic relay circuit 61 that passes and interrupts the motor current IM to be supplied to the electric motor 11.

The control device 90 has current detection means 54 for detecting a current flowing to the electric motor 10 via one ends of the shunt resistors 42, a microcomputer 52 that computes an assist torque on the basis of a steering torque signal and also computes a current equivalent to the assist torque by feeding back the motor current IM and the rotation position of the rotor, and a drive circuit 53 that outputs a drive signal to control the semiconductor switching elements Q1 through Q6 of the bridge circuit 41 according to a computation output of the microcomputer 52.

Although it is not shown in the drawing, the microcomputer 52 has a known self-diagnosis function besides an A-to-D converter and a PWM timer circuit. The microcomputer 52 therefore constantly makes a self-diagnosis as to whether the system is operating normally and interrupts the motor current IM upon occurrence of an abnormality.

An operation of the electric power steering apparatus configured as above will now be described.

The microcomputer 52 acquires a steering torque from the torque sensor 2 and a rotation position of the rotor of the electric motor 10 from the rotation position sensor 12. The microcomputer 52 also generates a rotation direction command of power steering and a current control amount equivalent to an assist torque upon input of the motor current IM fed back from the shunt resistors 42 via the current detection means 54 and inputs the rotation direction command and the current control amount into the drive circuit 53. Upon input of the rotation direction command and the current control amount, the drive circuit 53 generates a PWM drive signal and applies the PWM drive signal to the semiconductor switching elements Q1 through Q6 of the bridge circuit 41.

Owing to the operation as above, a current flows from the battery 1 to the electric motor 10 via an outside wire, the power connector 81, the coil 44, the bridge circuit 41, the electronic relay circuit 61, the motor connector 82, and an outside wire, so that an assist torque of a required amount is outputted in a required direction.

In this instance, the motor current IM is detected via the shunt resistors 42 and the current detection means 54 and fed back to the microcomputer 52, so that the motor current IM is controlled to coincide with a motor current command Im.

Although the motor current IM contains ripple components due to switching operations of the bridge circuit 41 driven under the PWM control, the motor current IM is controlled after it is smoothened by the large-capacity capacitor 43.

Further, although noises are generated by the switching operations of the bridge circuit 41 driven under the PWM control, the coil 44 prevents these noises from being released to the outside and turning to radio noises.

FIG. 2 through FIG. 7 are views showing the electric power steering apparatus of the first embodiment. Referring to FIG. 2 through FIG. 7, the electric motor 10, which is a brushless motor in the electric power steering apparatus, includes an output shaft 11, and a rotor 12 formed of an 8-pole permanent magnet fixed to the output shaft, a stator 13 provided on the periphery of the rotor, and the rotation position sensor 14 provided on an output side of the output shaft and detecting a rotation position of the rotor.

The stator 13 has 12 salient poles opposing the outer periphery of the permanent magnet, insulators (not shown) attached to the salient poles, and the armature winding 15 wound around the insulators and connected to three phases including phases U, V, and W.

Three ends of the armature winding 15 are respectively connected to three winding terminals extending axially to an output side of the output shaft.

The rotation position sensor 14 is a resolver 20 and has a resolver rotor 21 and a resolver stator 22.

An outside diameter of the resolver rotor 21 shapes a particular curve such that permeance of a radial clearance between the resolver stator 22 and the resolver rotor 21 varies sinusoidally with the angle.

An exciting coil and two sets of output coils are wound around the resolver stator 22. A two-phase output voltage that varies in a sine and cosine waveform is outputted by detecting a variance of the radial clearance between the resolver rotor 21 and the resolver stator 22.

The control device 90 is disposed between a speed reduction gear, which is a speed reducer (not shown) disposed coaxially with the electric motor 10, and the electric motor 10.

The speed reduction gear has a gear case, a worm gear to decelerate rotations of the output shaft provided inside the gear case, and a worm wheel meshed with the worm gear.

An end of the worm gear on the side of the electric motor 10 is splined.

An internally-splined coupling is press-fit to an end of the output shaft on the side of the speed reduction gear.

The coupling and the end of the worm gear are spline-coupled, so that a torque is transmitted from the electric motor 10 to the speed reduction gear via the coupling.

The electric motor 10 is fixed to a housing 70 and the control device 90 that controls the driving of the electric motor 10 is formed coaxially with the electric motor 10.

Figure 4:
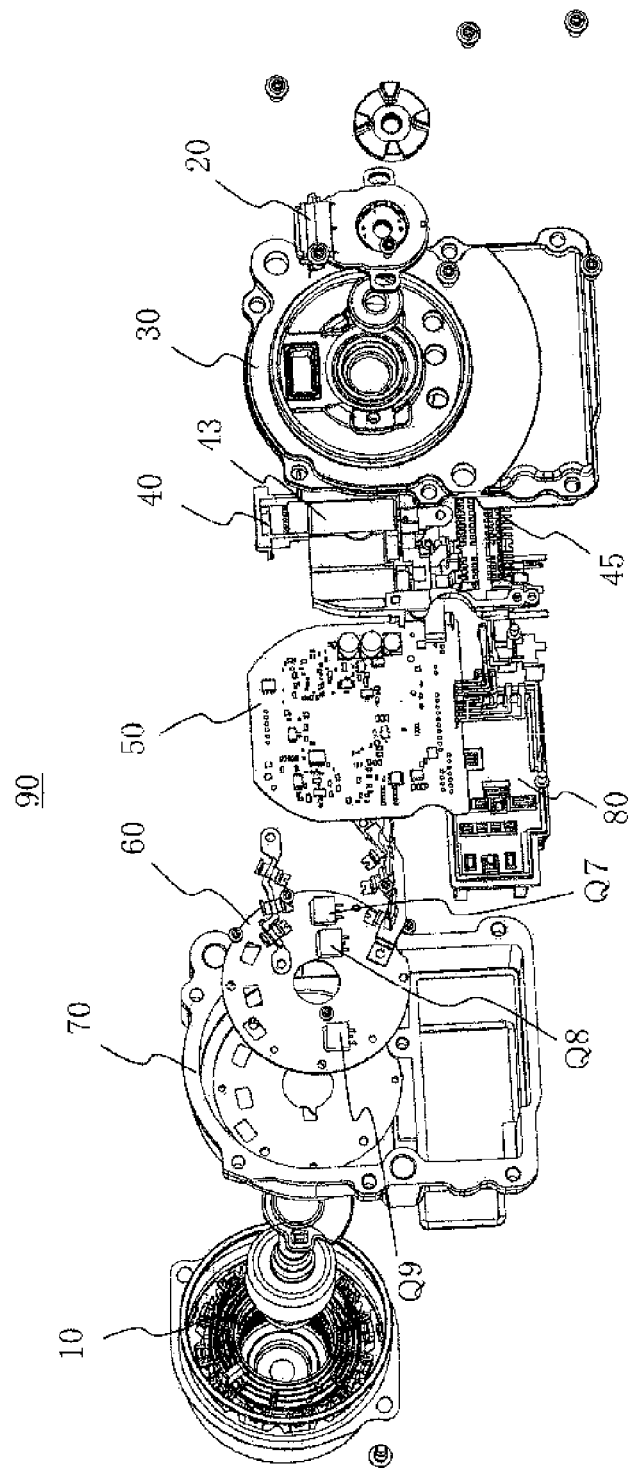
FIG. 4 is an exploded perspective view showing the electric power steering apparatus of the first embodiment.

As is shown in FIG. 4, the control device 90 has: a box-shaped heat sink 30 made of aluminum, which is a metal material having high heat conductivity; a power circuit board 40 having the bridge circuit 41 formed of a plurality of the semiconductor switching elements Q1 through Q6 to switch a current of the electric motor 10 according to a torque assisting the steering wheel and fixed to the heat sink 30; a control circuit board 50 having a control circuit 51 that generates a drive signal to control the bridge circuit 41 on the basis of a steering torque of the steering wheel and electrically connected to the power circuit board 40 via a plurality of flexible conductive plates 45; an electronic relay circuit board 60 having an electronic relay circuit 61 that passes and interrupts a motor current to be supplied to the electric motor 10 and electrically connected to the power circuit board 40 via the electric conductor; and the housing 70 to which the electronic relay circuit board 60 is attached and in which the power circuit board 40 and the control circuit board 50 are housed.

Figure 5:
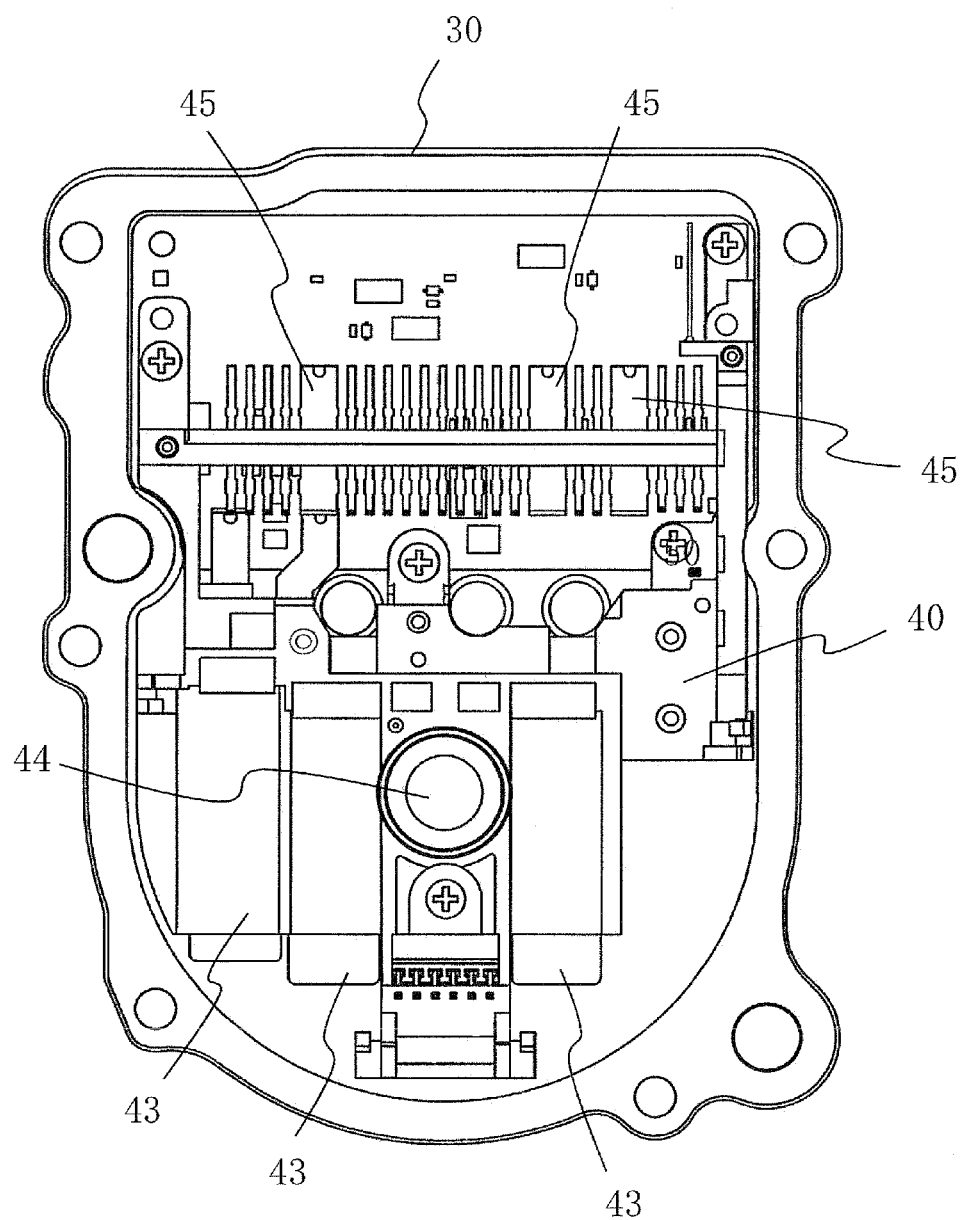
FIG. 5 is a cross section showing a power circuit board portion in a control device of the electric power steering apparatus of the first embodiment.
Figure 6:
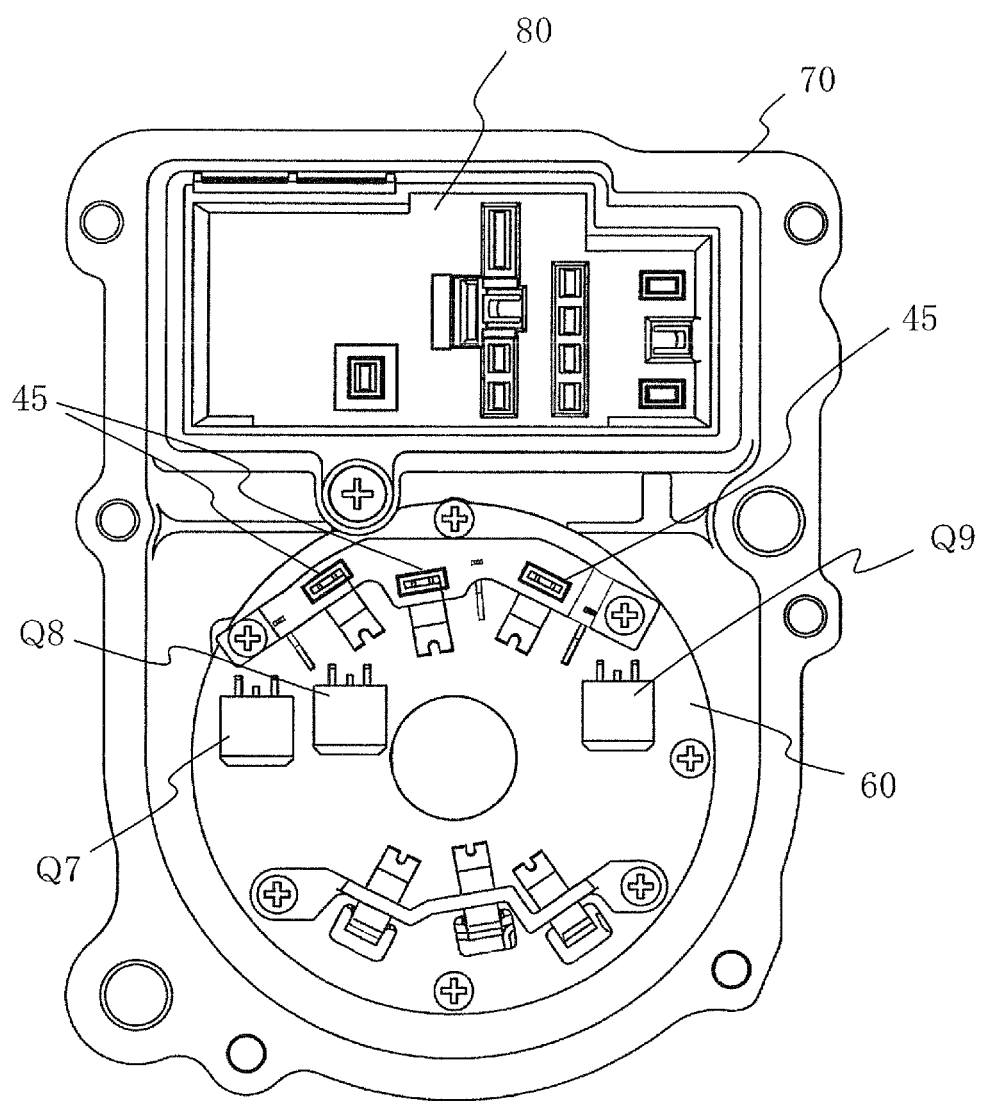
FIG. 6 is a plan view showing an electronic relay board portion of the electric power steering apparatus of the first embodiment when viewed from a housing side.

The power circuit board 40 is provided with a power circuit portion having the bridge circuit 41 formed of a plurality of the semiconductor switching elements Q1 through Q6, the capacitors 43, and the coil 44 (see FIG. 5).

Also, the microcomputer 52 and small-current components, such as peripheral circuit elements including the drive circuit 52 and the motor current detection means 54, are mounted on a wiring pattern on the control circuit board 50 by soldering.

Further, semiconductor switching elements Q7 through Q9 respectively connected to the three winding terminals of the armature winding 15 connected to the three phases including the phases U, V, and W are mounted on the electronic relay circuit board 60. The semiconductor switching elements Q7 through Q9 are respectively connected the conductive plates 45, which are three output terminals extending axially to the output side of the output shaft of the electric motor 10 by way of the electronic relay circuit 61 (see FIG. 6).

A connector 80 is a one-piece component molded from insulating resin.

The connector 80 includes the power connector 81 that is electrically connected to the battery 1 of the vehicle, the motor connector 82 that electrically connects the control device 90 and the electric motor 10, and the signal connector 83 that is connected to the torque sensor 2 in which a signal is inputted via an outside wire and to the vehicle speed sensor 3 that measures a travel speed of the vehicle.

The connector 80 is inserted into a hole, which is an opening of the heat sink 30, and connected to the heat sink 30.

It is configured in such a manner that the connector 80 is fixed as it is sandwiched between the heat sink 30 and the housing 70 by fastening the heat sink 30 to the housing 70.

An assembly procedure of the electric power steering apparatus configured as above will now be described.

Firstly, the electric motor 10 is assembled. The rotor is formed by attaching and fixing the permanent magnet to the output shaft, magnetizing the poles using a magnetizer, and press-fitting an inner ring of a bearing to the output shaft.

Subsequently, four windings in each of the phases U, V, and W, that is, a total of 12 windings are formed by winding the armature winding 15 of the respective phases U, V, and W around the 12 salient poles of the stator 13 via the insulators while shifting the positions to be electrically 120 degrees apart.

A layer U of the armature winding 15 is formed by connecting winding beginning parts of the respective windings of the phase U together and also connecting winding ending parts together. A layer V and a layer W of the armature winding 15 are formed in the same manner. The winding ending parts of the layers U, V, and W of the armature winding 15 are connected together and used as a neutral point.

The winding beginning parts of the respective layers U, V, and W of the armature winding 15 are connected to the corresponding winding terminals.

Thereafter, the stator 13 wound as above is press-fit into a yoke.

Subsequently, after an outer ring of the bearing is fixed to the housing 70, the output shaft 11 of the rotor 12 is press-fit into the inner ring of the bearing followed by press-fitting the rotor of the rotation position sensor 14 and the coupling to the output shaft 11.

Components, such as the semiconductor switching elements Q1 through Q6 and resistors, are disposed on the power circuit board 40, which is a metal board on which cream solder is applied to the respective electrodes. The electronic relay circuit board 60 is disposed on and fixed to the power circuit board 40 via holding members to connect the conductive plates 45 and soldered by melting the cream solder using a reflow device. The electronic relay circuit board 60 thus soldered is fixed to the housing 70. Further, the stator of the rotation position sensor 14 is fixed to the housing 70.

In this instance, heat-conductive grease may be applied between the housing 70 and the electronic relay circuit board 60 to enhance a heat releasing effect.

The yoke incorporating the stator is inserted into the housing 70 and thereafter the yoke is fixed to the housing 70 with screws (not shown).

An assembly procedure of the control device 90 will now be described.

Firstly, the microcomputer 52 and components, such as peripheral circuit elements, are disposed on the control circuit board 50 on which cream solder is applied to the respective electrodes. Also, a large-current conductive plate connecting between the power connector 82 and the coil 30 and between the U, V, W wires of the electric motor 10 and the conductive plates is disposed on the control circuit board 50. Further, chips to connect the conductive plates 45 are disposed on the control circuit board 50. Then, the respective components are soldered by melting the cream solder by heating the control circuit board 50 using the reflow device.

Likewise, components, such as the semiconductor switching elements Q1 through Q6 and the shunt resistors 22, are disposed on the power circuit board 40 on which cream solder is applied to the respective electrodes. Then, as with the control circuit board 50, chips to connect the conductive plates are disposed on the power circuit board 40 and the respective components are soldered by melting the cream solder using the reflow device.

The power circuit board 40 is fixed to the heat sink 30. The control circuit board 50 is combined oppositely with the power circuit board 40 in parallel, so that the conductive plates extended from the power circuit board 40 and inserted into the control circuit board 50 are electrically connected by soldering or the like.

In this instance, heat-conductive grease may be applied between the heat sink 30 and the power circuit board 40 to enhance a heat releasing effect.

Ends of the conductive plates coming out from the electronic relay circuit board 60 connected to the layers U, V, and W of the electric motor 10 and ends of the conductive plates coming out from the resolver stator 22 are formed of press-fit terminals 62. Hence, press-fitting is performed by setting the side of the control circuit board 50 of the control device 90 on the side of the electric motor 10 (see FIG. 7).

Figure 2:
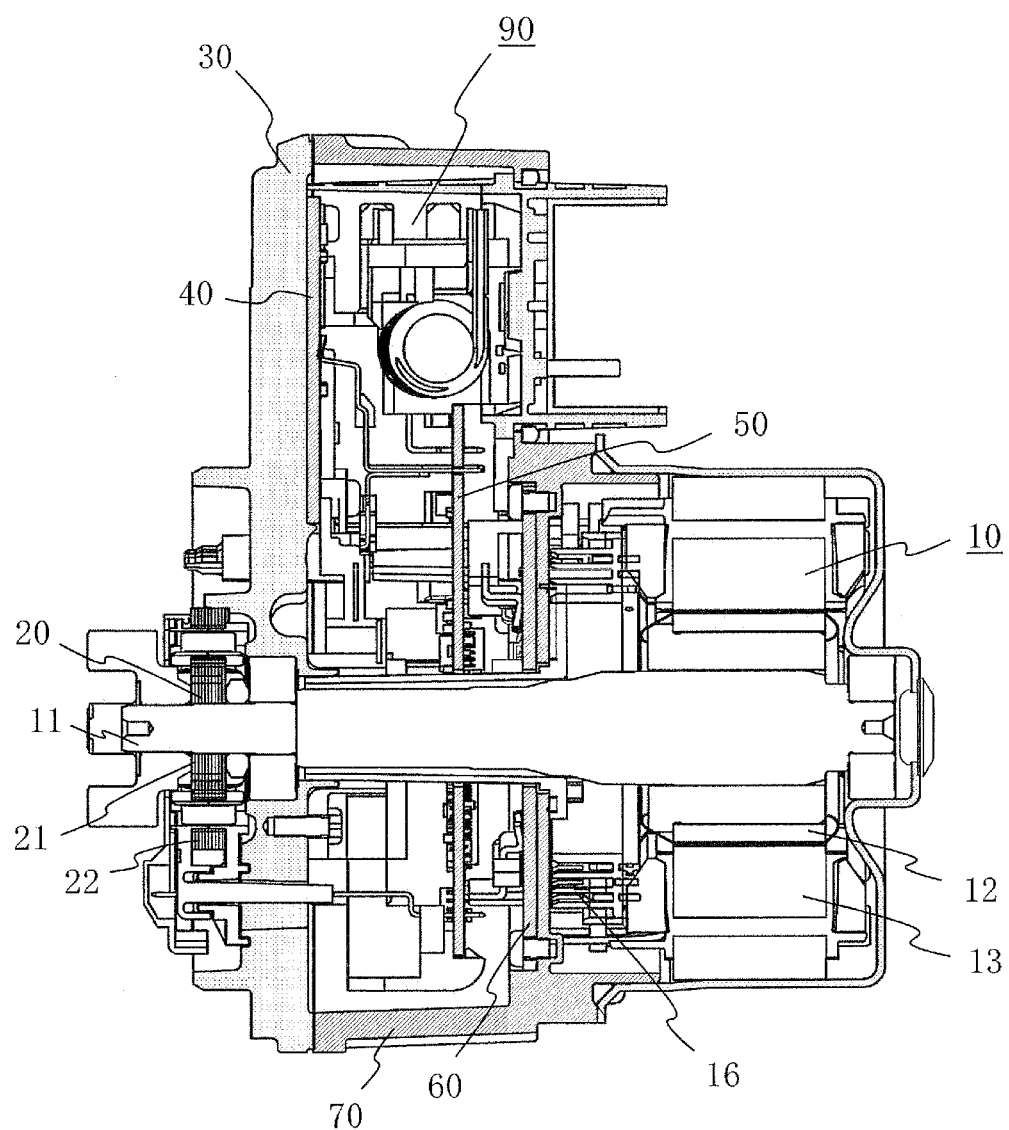
FIG. 2 is a longitudinal cross section showing the electric power steering apparatus of the first embodiment.
Figure 3:
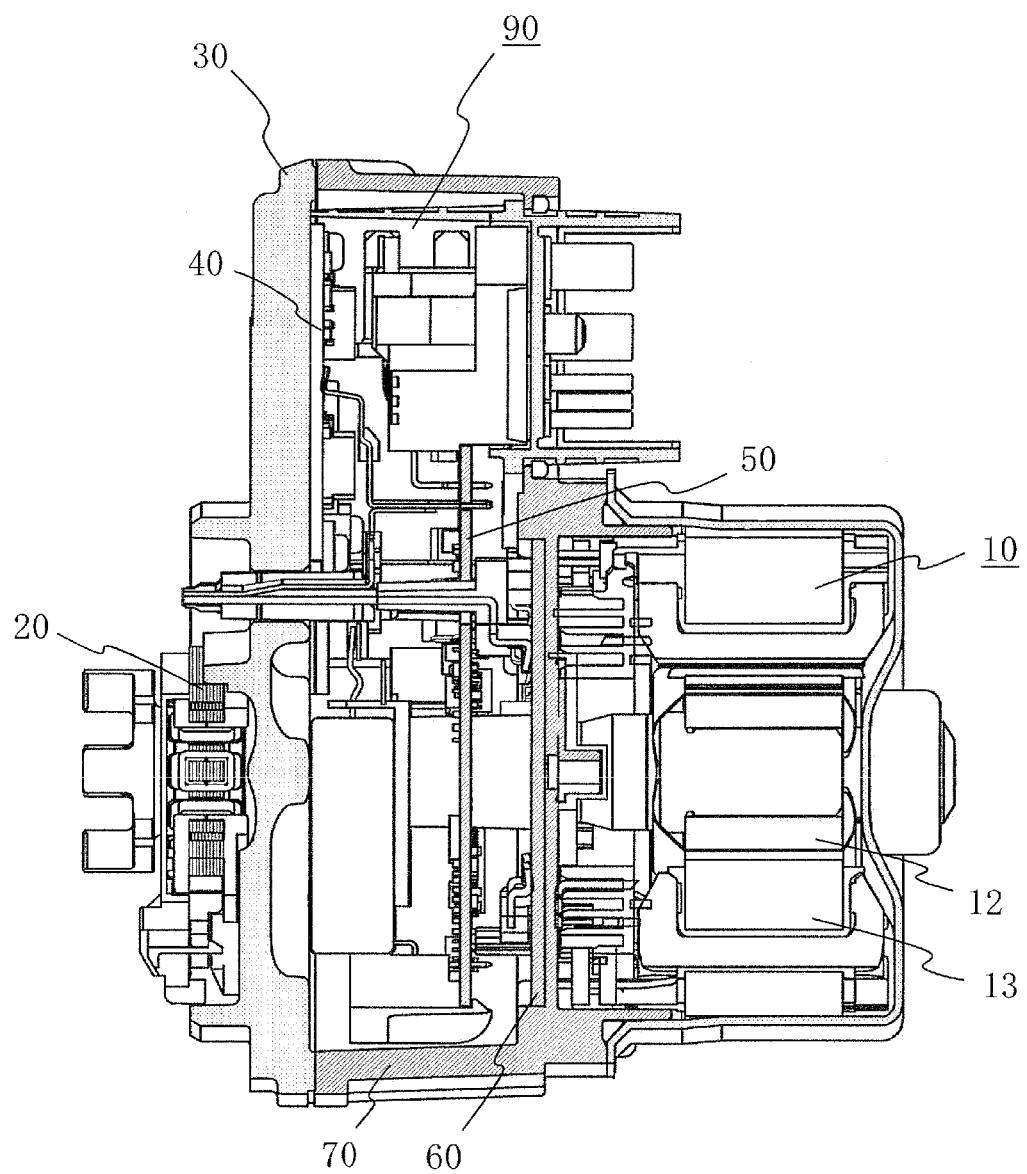
FIG. 3 is a longitudinal cross section showing the electric power steering apparatus of the first embodiment when viewed from a different angle.

Owing to the press-fitting as above, the electric motor 10 and the control device 90 are formed into one piece as are shown in FIG. 2 and FIG. 3.

As has been described, according to the electric power steering apparatus of the first embodiment, the control device 90 includes the power circuit board 40 on which is mounted the bridge circuit 41 formed of a plurality of the semiconductor switching elements Q1 through Q6 to switch a current of the electric motor 10 according to a torque assisting the steering wheel, the control circuit board 50 on which are mounted the capacitor 5 to absorb current ripples and the microcomputer 52 that generates a drive signal to control the bridge circuit 41 on the basis of a steering torque of the steering wheel, the large-current conductive plate which electrically connects the power circuit board 40 and the control circuit board 50 and through which a large current flows, and the signal conductive plate in and from which small-current signals are inputted and outputted. By disposing the electronic relay circuit board 60 in the housing 70, the apparatus can be reduced in size and fastening components can also be reduced.

Also, in the electric power steering apparatus, the ends of the conductive plates extended from the layers U, V, and W of the electric motor 10 and the ends of the conductive plates extended from the resolver stator 22 are electrically connected to the control circuit board 50 in the control device 90. Hence, an outside wire and a connector electrically connecting the electric motor 10 and the control device 90 are no longer necessary. Hence, not only can the cost and a power loss of the apparatus be reduced, but also radiation noises can be suppressed.

Figure 7:
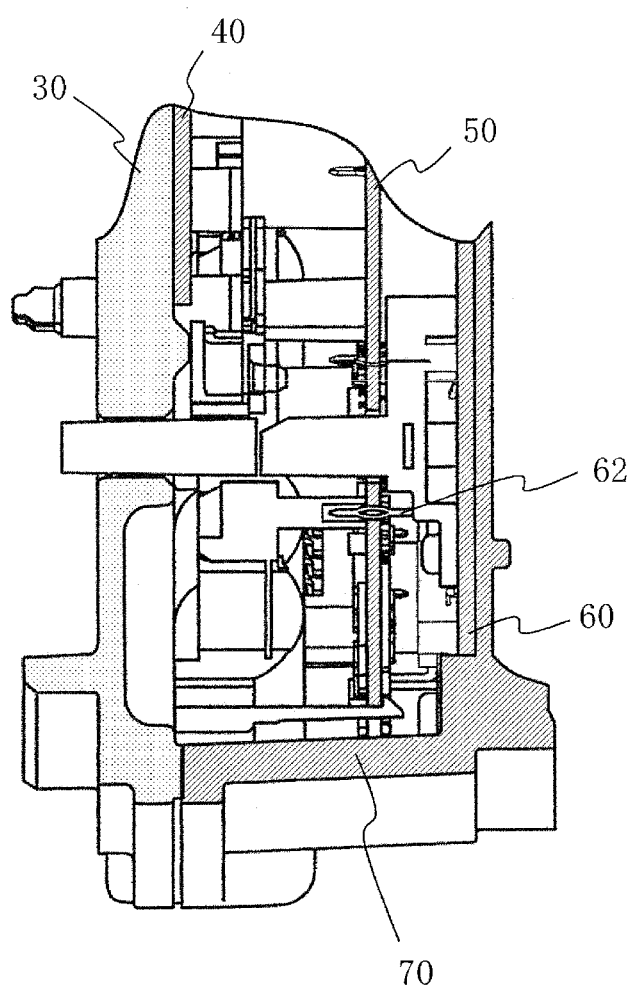
FIG. 7 is a cross section showing a connection portion of the electronic relay circuit board and a control circuit board of the electric power steering apparatus of the first embodiment.
Figure 8:
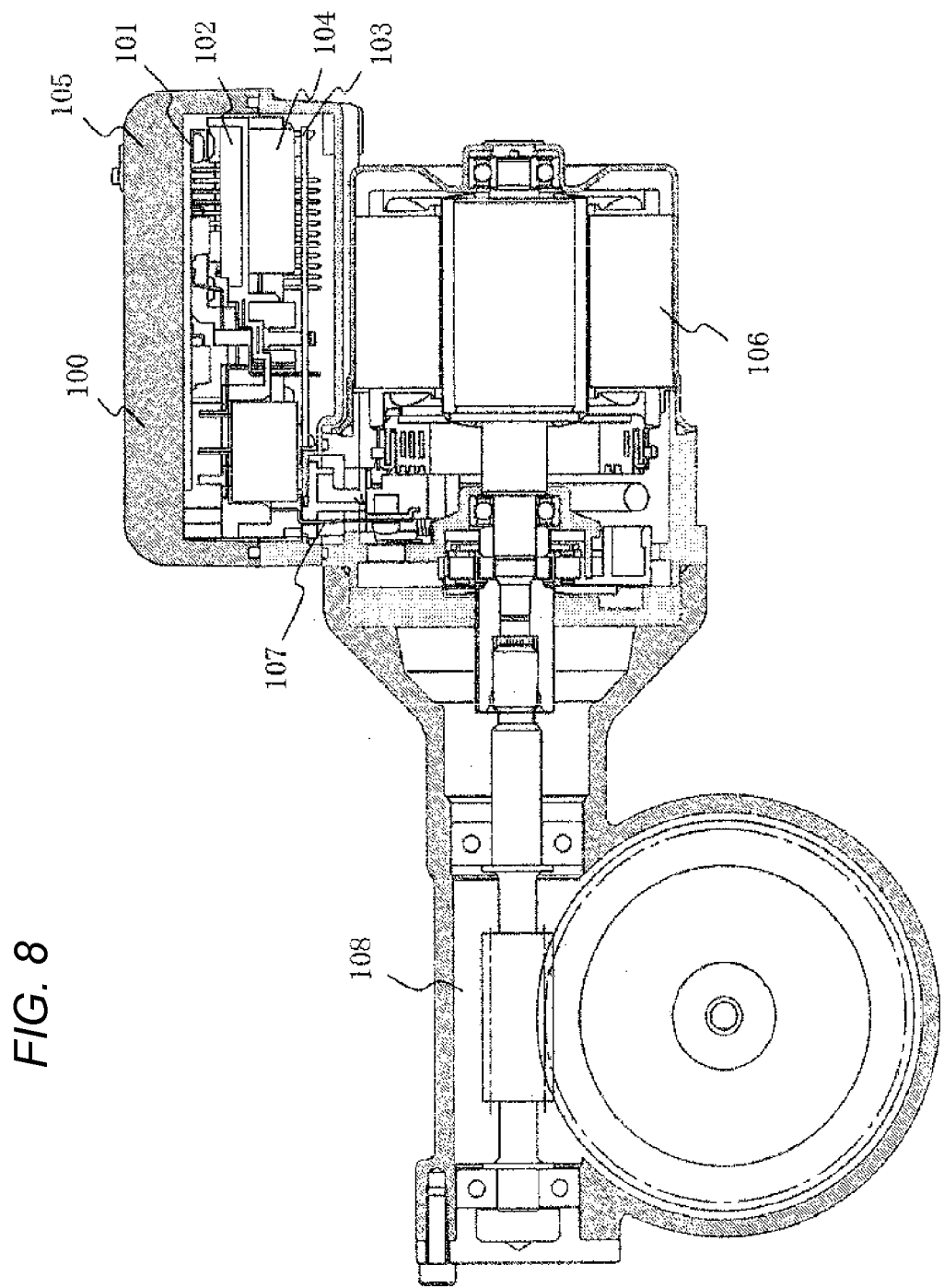
FIG. 8 is a longitudinal cross section showing an electric power steering apparatus in the related art.

Also, as is shown in FIG. 7, the electronic relay circuit board 60 and the control circuit board 50 are connected with the conductive terminals provided to the electronic relay circuit board 60. The press-fit terminals 62 are provided to one ends of the conductive terminals and internally-plated through-holes are provided to the control circuit board 50. By press-fitting the press-fit terminals 62 into the through-holes, the electronic relay circuit board 60 and the control circuit board 50 are electrically connected. This configuration can enhance the ease of machining.

By providing the electronic relay circuit board 60 concentrically with the shaft of the electric motor 10 in this instance, the electronic relay circuit board 60 undergoes a press-fitting force of the press-fit terminals 62. The electronic relay circuit board 60 can be therefore attached in a stable manner.

It should be appreciated that the power circuit board 40 is not limited to a metal board, and can be a circuit board having a metal base made of aluminum or the like having a high heat transfer rate or made of copper or the like having good heat conductivity on which the wiring pattern is formed via an insulating layer. Further, the power circuit board 40 may be a ceramic board.

Also, the rotation position sensor 14 employs the resolver 20 herein. It should be appreciated, however, that the rotation position sensor 14 is not limited to a resolver and may employ other magnetic detection elements, such as a magnetic resistor (MR), a giant magnetic resistor (GMR), a hole element, and a hole IC.

The electric motor 10 is not limited to a brushless motor, either. The electric motor 10 may be an induction motor, a switched reluctance motor (SR motor), or a brushed DC motor.

Reference Signs List

1: battery, 2: torque sensor, 3: vehicle speed sensor 10: electric motor, 11; output shaft, 12: rotor, 13: stator 14: rotation position sensor, 15: armature winding 20: resolver, 21: resolver rotor, 22; resolver stator 30: heat sink 40: power circuit board, 41; bridge circuit, 42: shunt resistor 43: capacitor, 44: coil, 45: conductive plate, Q1 through Q6: semiconductor switching elements 50: control circuit board, 51: control circuit, 52: microcomputer 53: drive circuit, 54: current detection means 60: electronic relay circuit board, 61: electronic relay circuit 62: press-fit terminal, Q7 through Q9: semiconductor switching elements 70: housing 80: connector, 81: power connector, 82: motor connector 83: signal connector 90: control device

The invention claimed is:

1. An electric power steering apparatus including an electric motor that outputs an assist torque for a steering wheel of a vehicle, a speed reducer that decelerates rotations of the electric motor, and a control device that controls driving of the electric motor, characterized in that:

the control device is disposed coaxially with an output shaft of the electric motor between the electric motor and the speed reducer; and the control device includes, a heat sink that is made of a metal material having high heat conductivity, a power circuit board that has a bridge circuit formed of a plurality of semiconductor switching elements to switch a current of the electric motor according to a torque assisting the steering wheel and is fixed to the heat sink, a control circuit board that has a control circuit generating a drive signal to control the bridge circuit on the basis of a steering torque of the steering wheel and is electrically connected to the power circuit board via an electric conductor, an electronic relay circuit board that has an electronic relay circuit passing and interrupting a motor current to be supplied to the electric motor and is electrically connected to the power circuit board via the electric conductor, and a housing to which the electronic relay circuit board is attached and in which the power circuit board and the control circuit board are housed for protection.

2. The electric power steering apparatus according to claim 1, characterized in that:

the power circuit board, the control circuit board, the electronic relay circuit board, and the housing are disposed concentrically with the output shaft of the electric motor.

3. The electric power steering apparatus according to claim 1, characterized in that:

the electronic relay circuit board is disposed on an inner side of the housing on a side where the control circuit board is attached; and the housing is combined with the heat sink so as to house the electronic relay circuit board therein.

4. The electric power steering apparatus according to claim 1, characterized in that:

the electronic relay circuit board and the control circuit board are electrically connected by press-fitting a press-fit terminal provided to the electronic relay circuit board into a through-hole provided to the control circuit board.

* * * * *